United States Patent
Herzer et al.

[15] 3,655,241
[45] Apr. 11, 1972

[54] ADJUSTABLE HEAD REST FOR VEHICLES

[72] Inventors: Kurt Herzer, Karlsruhe am Durlach; Wolfgang Mertens, Karlsruhe, both of Germany

[73] Assignee: Kurt Herzer, Karlsruhe am Durlach, Germany

[22] Filed: Nov. 24, 1969

[21] Appl. No.: 879,398

[30] Foreign Application Priority Data

Apr. 30, 1969    Germany ...................... P 19 22 086.1

[52] U.S. Cl. .............................. 297/408, 248/408, 297/410, 297/396
[51] Int. Cl. ........................................................ A47c 1/10
[58] Field of Search .................. 247/408, 396, 410, 403, 407, 247/437, 397; 248/408, 407, 423

[56] References Cited

UNITED STATES PATENTS 2,636,552   4/1953   Long ................................. 297/396 X
3,205,005   9/1965   Brown .............................. 297/410 X
3,307,874   3/1967   Wilson ................................. 297/397
3,462,193   8/1969   Tamura ............................... 297/410
3,506,306   4/1970   Herzer et al. ........................ 297/410

FOREIGN PATENTS OR APPLICATIONS 1,065,152   5/1954   France ............................. 155/177 X Primary Examiner—Bobby R. Gay
Assistant Examiner—Garry Moore
Attorney—Edwin E. Greigg

[57] ABSTRACT

An angularly and vertically adjustable head rest which is secured to a back rest of a motor vehicle seat. The heat rest may be immobilized in a desired height position by locking mechanism disposed entirely within and surrounded by the foam plastic cushion of the head rest. For height adjustment a first locking mechanism may be released by lateral pressure applied against one edge portion of the head rest and for tilting adjustment a second locking mechanism may be released by pressure applied to the opposite side edge of the head rest.

9 Claims, 4 Drawing Figures

ADJUSTABLE HEAD REST FOR VEHICLES

BACKGROUND OF THE INVENTION

Head rests for attachment to, as well as to be built into, back rests of motor vehicle seats are well known in a great variety of models.

Generally, known types of head rests for motor vehicles employ adjusting rails providing for height adjustment of the head rest with the rails being situated outside of the shaped body of the head rest or laterally disposed therein directly under the cover and also include head rests which are adjustably attached to the rails by means of set screws or other clamping means. However, adjusting rails and the means by which the head rests are attached thereto can easily cause injuries in case of an accidental impact, particularly for the passengers in the back seat of the motor vehicle equipped with the conventional type of head rest.

Indeed, these known head rests provided with spring locks, friction clamping or form-locking spring-loaded bars of synthetic resin or racks have already been proposed without externally exposed injury-causing operating parts, but all possess the disadvantage of being actuated in the plane of direction of forces resulting from accidents. Since the forces produced by accidents are much greater than those expected from manual adjustment, the head rest cushion is frequently forced into an injury-creating position under the impact of the accident. During an accident the head rest cushion may be displaced from a position adjacent the back of the head to the back of the neck of the person especially if the body of the person who may be riding in the front seat of the vehicle is taken into account and this may even result in the breaking of the neck of such person.

One of the known reinforcements that are not capable of absorbing excessive forces produced by automotive accidents comprise wire loops and another includes metal plate elements, the sharp edges of which may exert dangerous splitting forces on the cranium should they penetrate the head rest cushion.

OBJECTS AND SUMMARY OF THE INVENTION

In contrast with the foregoing, the basic purpose of the present invention, when head or neck rests are to be built, is to release all the forces developed during accidents by form-locking arrangement for purposes of adjustment by means of lateral displacement, that is, to permit the power means to be adjusted manually to act in one direction which is perpendicular to the plane of forces caused possibly by accidents from the front or rear or by overturning of the vehicle.

In a combination with the known tilting arrangement of the upper part or head rest which is operated in one direction by lateral displacement thereof which releases a pin from locking engagement with a perforated bar or removes crown teeth from engagement, the vertical height adjustment device proposed by the present invention is unlocked by displacement of the upper part in the opposite direction. This produces the particular advantage that there are no operating parts situated outside of the cushion element that could possibly cause injuries either during the vertical movement or tilting adjustment of the head rest.

The spaced housings of the inner reinforcement which support the cushion of the head rest contain locking devices for the perforated bars which are slidably arranged therein. The locking devices carried within the head rest are disengaged by a displacement which is effected by a first lateral pressure against the head cushion for the purpose of vertical height adjustment. Suitably, the locking devices include spring-loaded locking elements positioned in each of the spaced housings and further comprise shear pins which engage perforations in slidable bars with engagement of the respective elements being maintained by means of suitable springs carried in each of the housings and arranged to exert a pressure on the bars. During assembly, the springs are suitably inserted from below into the housings and are held therein in a known manner. An additional retaining spring may be provided for this latter purpose with the spring being fixed in position by the locking device being arranged to extend therethrough. The locking devices may be disengaged by overcoming the pressure of the springs so that the locking elements will release the pins from the perforated bar for height displacement of the head cushion.

The perforated bars slidably positioned in the housings are designed so as to possess a high momentum of resistance in the direction of travel and, in addition, have an element cooperating therewith which forms a stop for preventing excessive withdrawal of the head cushion.

The inner reinforcement for the head cushion arranged to receive the perforated bars is suitably constructed of metal or synthetic resin and so designed at the upper edge portion thereof that it possesses the maximum momentum of resistance for the absorption of forces produced by accidents. This edge portion should have a wide rounded surface so that piercing of the head cushion is prevented even in the event of maximal forces which may occur during collisions.

The perforated bars should be provided with stop elements that prevent removal of the head cushion as well as limit the possibility of vertical adjustment to such an extent that a sufficient transmission of force from the shaped part of the inner structure of the head cushion to the adjusting braces is provided.

Furthermore, the invention possesses additional advantages that no further apertures are required in the inner reinforcement of the head cushion other than those described for the perforated bars since all of the elements providing for vertical adjustment are arranged in the spaced housings of the inner reinforcement member. Therefore, this structure is well adapted to be covered with a foam plastic cushion and is so arranged that the foam material, during foaming pressure, cannot enter into the adjusting devices. Also, the foamed plastic cushion is given such a shape that a portion thereof on the one hand extends downward a considerable extent to the rear of the seat back rest to thereby completely cover the adjusting rails in the uppermost position of the head cushion and to absorb with its cushion effect the impact of the rear seat passengers in collisions, and on the other hand is situated well beneath the upper edge of the back rest in the lowest position of the head cushion.

Further objects and advantages will become apparent from a reading of the following detailed specification taken in conjunction with the drawings.

DESCRIPTION OF THE EMBODIMENT

Figure 1:
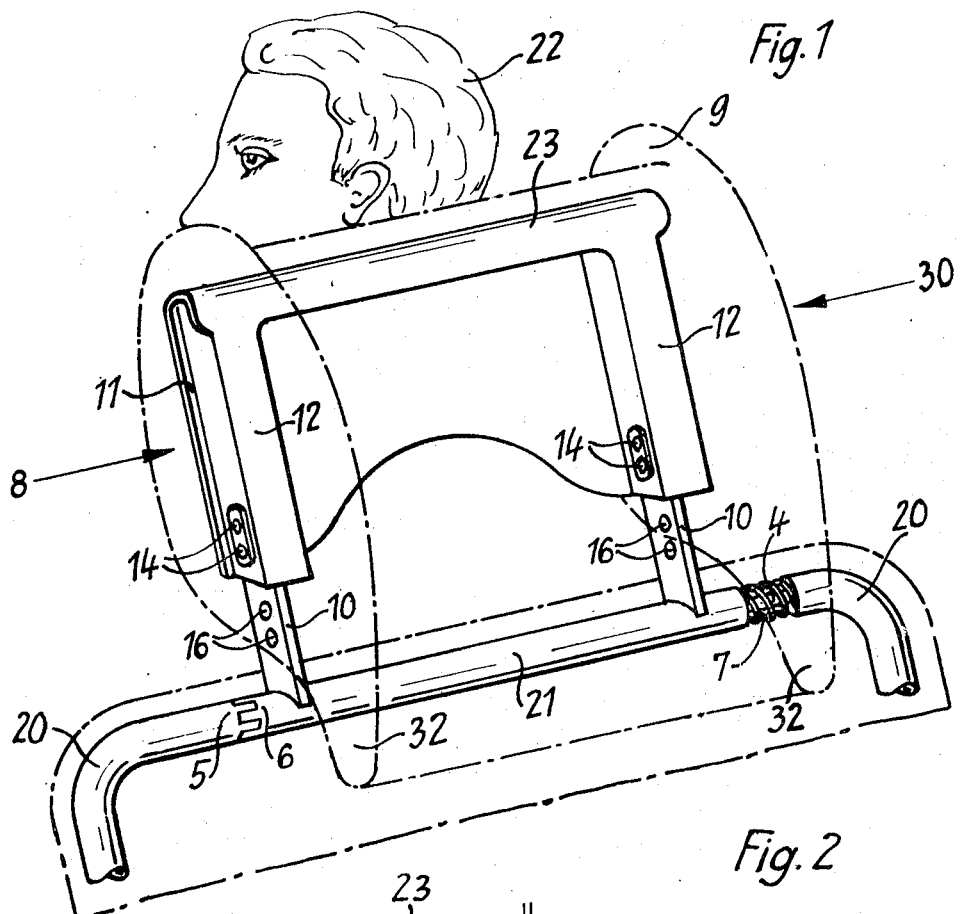
FIG. 1 is a perspective view showing the essential parts comprising the invention in a three-quarter elevational view with the head cushion covering and the back rest of the motor vehicle being shown in phantom outline.

Turning now to the drawings, FIG. 1 shows a general view of the preferred embodiment of the invention as it is built into the back rest of a vehicle seat with the inner structure shown and the cushion illustrated merely in outline. A pair of adjusting braces or bars 10 arranged for height adjustment and having a high momentum of resistance in the direction of travel of the vehicle on a rotatable sleeve 21 and laterally displaceable on a shaft 4 and secured against rotation by means of the complemental tooth elements 5 and 6, the release from said teeth being effected by a lateral pressure applied in the direction of the arrow 8 against the head rest cushion 9 which then overcomes the strength of the spring 7 so that the head rest can be tilted to and fro.

The height adjusting bars 10 are arranged to slide in spaced housings 12 of the inner reinforcement of the head cushion with the side plates 11 (one shown) being provided with a relatively wide surface and preferably is formed with a well-rounded head portion 23 in order to increase the momentum of resistance as well as eliminate any sharp edges which could penetrate the head cushion in an accident.

Figure 2:
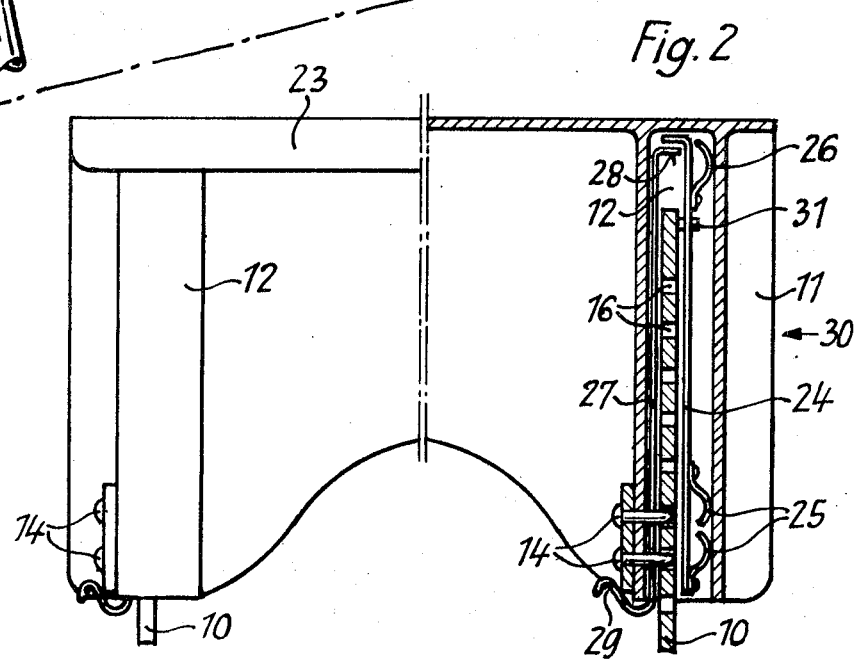
FIG. 2 shows both in elevation and in cross section the adjusting mechanism for the head cushion.

The view in FIG. 2 shows in the right half thereof the cooperative elements in cross section. The spaced housings 12 of the inner reinforcement member include spaced walls, the innermost of which is provided with pins or screws 14 which are set into the wall and arranged to extend through apertures therein so that they may be brought into engagement with the perforations 16 provided in the height adjustment bar 10. The engagement of the bars and pins is maintained by a plate spring 24 that exerts its primary force in the area of pins 14 by means of spring tongues 25, while an additional spring tongue 26 is provided at the upper end of the plate and is used for guiding purposes and to hold the plate 24 in proper relation relative to the inner wall. As shown, plate spring 24 is retained in its innermost position by angular projection 28 provided on the auxiliary leaf spring 27. This leaf spring is positioned between the perforated bar 10 and the other wall of the housing of the inner reinforcement and is retained by the pins 14. During assembly the leaf spring is snapped into position relative to one wall of the housing by means of the spring hook 29. It will be apparent that vertical adjustment of the elements described is readily attained by a lateral pressure applied in the direction of arrows 30 against the head cushion 9 thus overcoming the spring-loaded member 24 and thereby permitting shifting of the head cushion 9 toward the left as viewed in the drawing and then permitting proper height adjustment to be made.

The perforated bar 10 is provided with a stop means 31 for height adjustment of the cushion member and is arranged to slide in an elongated slot in the plate spring 24 and to thus limit height adjustment of the cushion to such an extent that the length of the engagement of the perforated bar 10 required for the absorption of the forces generated is maintained entirely within the housings 12.

Figure 3:
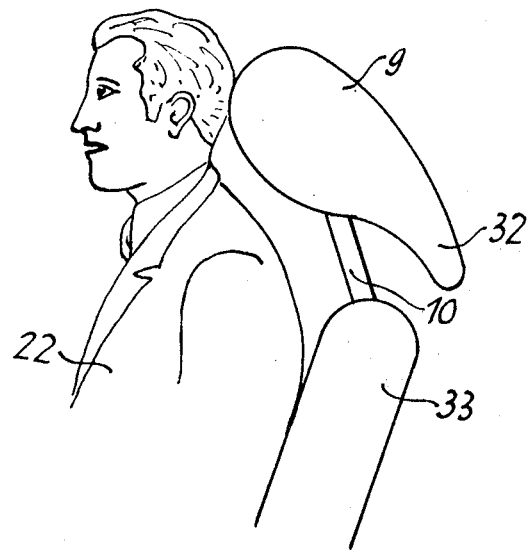
FIG. 3 is an elevational view showing a tall individual utilizing the head rest in its uppermost position.

FIG. 3 shows a head and neck rest of the preferred embodiment in side elevation with cushion 32 forming an integral part thereof projecting a considerable extent to the rear of the head rest portion thus forming a shock absorber for those passengers who are seated in the rear of the vehicle and who are likely to be thrown forwardly by any accident. As illustrated the cushion 9 is in its uppermost position of height adjustment for a tall user illustrated at 22 with this individual being shown with a corresponding curvature of the spinal column in the shoulder portion and assumed to be in the position of an individual driving a vehicle.

Figure 4:
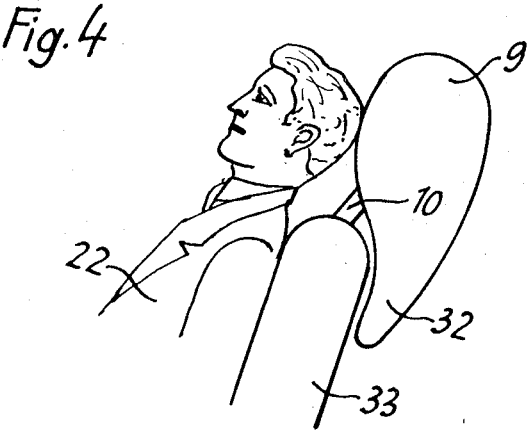
FIG. 4 shows the head rest being used by a short individual in a reclining position.

As distinguished from the showing in FIG. 3, that of FIG. 4 illustrates the conditions of use of the device by a person of smaller stature who is reclining in the passenger seat in a relaxed position. For this purpose the head rest is tilted backward as well shown in this figure into a low position so that the trailing or terminal portion of the cushion 32 extends downwardly behind the upper edge of the vehicle back rest 33.

What is claimed is:

1. In an improved head and neck rest for mounting on supports carried by the back rest of a motor vehicle, the combination comprising, a head cushion member, means for mounting said head cushion member for adjustment relative to said back rest, said means further including first spring-loaded locking means having first and second portions, said spring-loaded locking means being actuable through a first lateral pressure exertion on said head cushion member whereby vertical adjustment thereof is achieved, and a second spring-loaded locking means which is actuated by a second lateral pressure exertion applied against said head cushion member, whereby tilting movement thereof is achieved.

2. In an improved head and neck rest as claimed in claim 1, wherein the head cushion member includes reinforcement means interiorly thereof, said means including spaced housings each provided with a first portion of said locking means and a second portion of said locking means cooperable therewith affixed to said support carried by the back rest and cooperable with said first portion of the locking means.

3. In an improved head and neck rest as claimed in claim 2, wherein the first portion of said locking means includes at least a pair of offstanding pin elements and the second portion of said locking means includes a perforated bar having a first face cooperable therewith.

4. In an improved head and neck rest as claimed in claim 3, wherein the second portion of said locking means further includes a carrier means for longitudinally-spaced spring tongue members.

5. In an improved head and neck rest as claimed in claim 3, wherein further means are included to exclude withdrawal of the perforated bars from each of the spaced housings.

6. In an improved head and neck rest as claimed in claim 4, wherein the first face of the perforated bar further includes stop means cooperable with the carrier means whereby complete removal of the head cushion member is prevented without disengagement of the first spring-loaded locking means.

7. In an improved head and neck rest as claimed in claim 2, wherein the reinforcement means for said head cushion member includes a laterally extending portion complemental thereto.

8. In an improved head and neck rest as claimed in claim 2, wherein the head cushion member includes an exterior head and neck supporting portion spaced from said reinforcement means by foam plastic cushion-like material.

9. In an improved head and neck rest as claimed in claim 1, wherein the head cushion member includes a downwardly extending terminal portion that generally conforms to the rear of the back rest.

* * * * *